United States Patent
Takarazawa et al.

(10) Patent No.: US 12,422,827 B2
(45) Date of Patent: Sep. 23, 2025

(54) MOTOR CONTROL DEVICE, INDUSTRIAL MACHINE SYSTEM, AND MOTOR CONTROL METHOD

(71) Applicant: Fanuc Corporation, Yamanashi (JP)

(72) Inventors: Shun Takarazawa, Yamanashi (JP); Satoshi Ikai, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 138 days.

(21) Appl. No.: 18/289,162

(22) PCT Filed: May 17, 2021

(86) PCT No.: PCT/JP2021/018659
§ 371 (c)(1),
(2) Date: Nov. 1, 2023

(87) PCT Pub. No.: WO2022/244078
PCT Pub. Date: Nov. 24, 2022

(65) Prior Publication Data
US 2024/0219890 A1 Jul. 4, 2024

(51) Int. Cl.
*G05B 19/4155* (2006.01)
(52) U.S. Cl.
CPC ............ *G05B 19/4155* (2013.01); *G05B 2219/34429* (2013.01)
(58) Field of Classification Search
CPC ...... G05B 19/4155; G05B 2219/34429; G05B 2219/41251; B25J 9/1641
(Continued)

(56) References Cited

U.S. PATENT DOCUMENTS 8,896,255 B2  11/2014  Iwashita et al.
9,075,400 B2 *  7/2015  Igarashi ............ H02P 23/0004
(Continued)

FOREIGN PATENT DOCUMENTS

JP  2014013554 A  1/2014
JP  2016076119 A  5/2016
(Continued)

OTHER PUBLICATIONS

International Search Report and Written Opinion for International Application No. PCT/JP2021/018659, dated Jul. 20, 2021, 5 pages.

*Primary Examiner* — David Luo
(74) *Attorney, Agent, or Firm* — Buchanan Ingersoll & Rooney PC

(57) ABSTRACT

A control device includes: a command generating unit that generates a command for a motor; a correction-amount calculating unit that performs correction-amount calculation processing for calculating a correction amount for the command on the basis of elastic parameters of elastic elements; and a stage detecting unit that detects the fact that a transition has been made from a first stage in which a driving force generated by the motor acts on the first elastic element to a second stage in which the driving force acts on the second elastic element via the first elastic element. When the transition from the first stage to the second stage is detected, the correction-amount calculating unit switches from first correction-amount calculation processing based on the first elastic parameter of the first elastic element to second correction-amount calculation processing based on the second elastic parameter of the second elastic element and the first elastic parameter.

13 Claims, 13 Drawing Sheets

(58) Field of Classification Search
USPC .................................................. 318/632, 560
See application file for complete search history.

(56) References Cited

U.S. PATENT DOCUMENTS

| | | |
|---|---|---|
| 9,760,082 B2 | 9/2017 | Ikai et al. |
| 2018/0246491 A1 | 8/2018 | Shinoda et al. |

FOREIGN PATENT DOCUMENTS

| | | |
|---|---|---|
| JP | 2018139044 A | 9/2018 |
| JP | 2020093595 A | 6/2020 |

* cited by examiner

MOTOR CONTROL DEVICE, INDUSTRIAL MACHINE SYSTEM, AND MOTOR CONTROL METHOD

CROSS REFERENCE TO RELATED APPLICATIONS

This is the U.S. National Phase application of PCT/JP2021/018659, filed May 17, 2021, the disclosure of this application being incorporated herein by reference in its entirety for all purposes.

FIELD OF THE INVENTION

The present disclosure relates to a motor control device, an industrial machine system, and a motor control method.

BACKGROUND OF THE INVENTION

A technology by which a control device configured to control a motor connected to a driven body via an elastic element (e.g., a ball screw) corrects a command to the motor in response to elastic deformation of the elastic element is known (e.g., Patent Document 1).

PATENT LITERATURE

Patent Document 1: JP 2014-013554 A

SUMMARY OF THE INVENTION

In some cases, a plurality of elastic elements are interposed between a motor and a driven body, and the plurality of elastic elements are elastically deformed in stages, which affects positioning accuracy of the driven body by the motor. In related art, there is a demand for a technique for improving positioning accuracy in such a case.

In one aspect of the present disclosure, a control device connected to a driven body via a plurality of elastic elements and configured to control a motor that drives the driven body includes a command generating section configured to generate a command for operating the motor so as to accelerate, a correction amount calculating section configured to execute correction amount calculation processing to obtain a correction amount of the command, based on an elastic parameter representing elasticity of the elastic element, and a stage detecting section configured to detect transition from a first stage in which a driving force generated by the motor in response to the command acts on a first elastic element to a second stage in which the driving force acts on a second elastic element through the first elastic element.

When the transition from the first stage to the second stage is detected, the correction amount calculating section switches the correction amount calculation processing to be executed, from first correction amount calculation processing executed based on a first elastic parameter of the first elastic element, to second correction amount calculation processing executed based on the first elastic parameter and a second elastic parameter of the second elastic element.

In another aspect of the present disclosure, a method of controlling a motor connected to a driven body via a plurality of elastic elements and configured to drive the driven body includes, by a processor, generating a command for moving the motor so as to accelerate, executing correction amount calculation processing to obtain a correction amount of the command, based on an elastic parameter representing elasticity of the elastic element, detecting transition from a first stage in which a driving force generated by the motor in response to the command acts on a first elastic element to a second stage in which the driving force acts on a second elastic element through the first elastic element, and switching the correction amount calculation processing to be executed, from first correction amount calculation processing executed based on a first elastic parameter of the first elastic element, to second correction amount calculation processing executed based on the first elastic parameter and a second elastic parameter the second elastic element when the transition from the first stage to the second stage is detected.

According to the present disclosure, it is possible to obtain a correction amount suitable for a stage in which the driving force of the motor acts on a plurality of elastic elements. Thus, when the motor and the driven body are connected via the plurality of elastic elements, an error caused by staged elastic deformation of the plurality of elastic elements can be highly accurately canceled, and thus positioning accuracy of the driven body by the motor can be improved.

DETAILED DESCRIPTION OF EMBODIMENTS OF THE INVENTION

Figure 1:
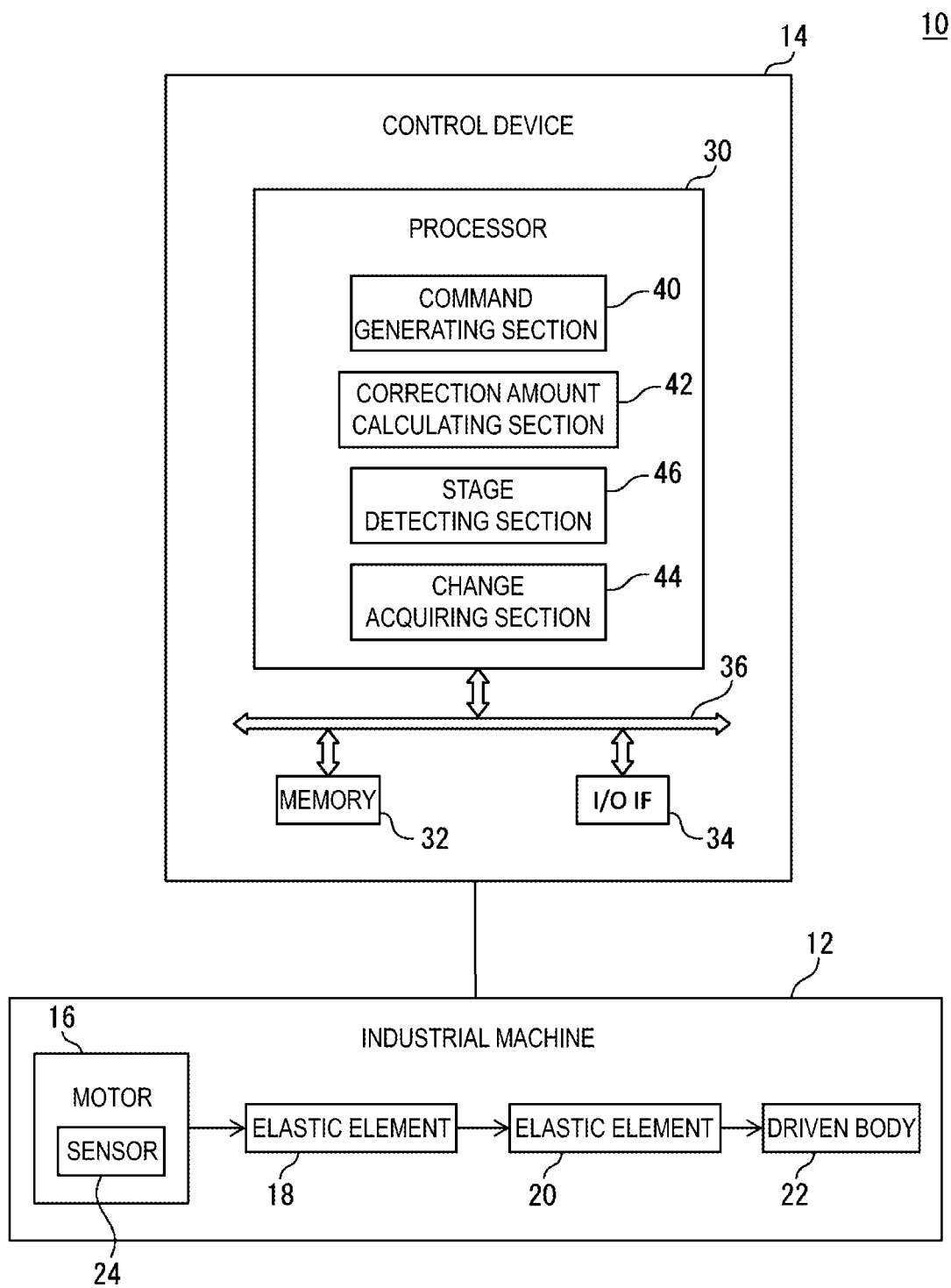
FIG. 1 is a block diagram of an industrial machine system according to an embodiment.

Embodiments of the present disclosure will be described in detail below based on the drawings. Note that, in the various embodiments described below, similar elements are denoted by the same signs, and redundant descriptions are omitted. First, an industrial machine system 10 according to an embodiment will be described with reference to FIG. 1 and FIG. 2. The industrial machine system 10 includes an industrial machine 12 and a control device 14.

The industrial machine 12 is for performing a predetermined work (cutting, welding, and the like) on a workpiece, and includes a motor 16, a plurality of elastic elements 18 and 20, and a driven body 22. The motor 16 is a servo motor as an electric motor, for example, and rotationally drives an output shaft 16a (FIG. 2) in response to a command from the control device 14.

The output shaft 16a of the motor 16 and the driven body 22 are mechanically coupled to each other via the plurality of elastic elements 18 and 20. For example, the elastic element 18 is a ball screw extending straight along an axis A and is a member (e.g., an iron member) having an elastic parameter PR1.

The elastic parameter PR1 is a parameter representing the elasticity of the elastic element 18, and has, for example, a spring constant k1, compliance C1 (=1/k1), or an elastic modulus G1 (including Young's modulus, rigidity modulus, Poisson's ratio, or the like). In the following description, the direction along the axis A indicated by an arrow B in FIG. 2 may be referred to as the right side. The left end of the elastic element 18 is fixed to the output shaft 16a of the motor 16.

On the other hand, the elastic element 20 is a sealing mechanism that is interposed between the elastic element 18 and the driven body 22, for example, and prevents foreign matters from entering the inside of a casing (not illustrated) that accommodates the elastic element 18, and is a member (e.g., a rubber member) having an elastic parameter PR2. The elastic parameter PR2 is a parameter representing the elasticity of the elastic element 20, and can have a spring constant k2, compliance C2 (=1/k2), or an elastic modulus G2.

The driven body 22 is, for example, a work table on which a workpiece is placed, and has an engagement part 22a that engages with the elastic element 18 as a ball screw. With the motor 16 rotationally driving the output shaft 16a, the elastic element 18 is rotated about the axis A, and the driven body 22 is reciprocated in the direction of the axis A in response to the rotation of the elastic element 18.

On the other hand, the elastic element 20 as a sealing mechanism is in contact with the driven body 22, elastically deforms in response to the reciprocation of the driven body 22, and applies a force such as a stress of elastic deformation and a frictional force to the driven body 22. Thus, the motor 16 drives the driven body 22 via the elastic elements 18 and 20.

Figure 2:
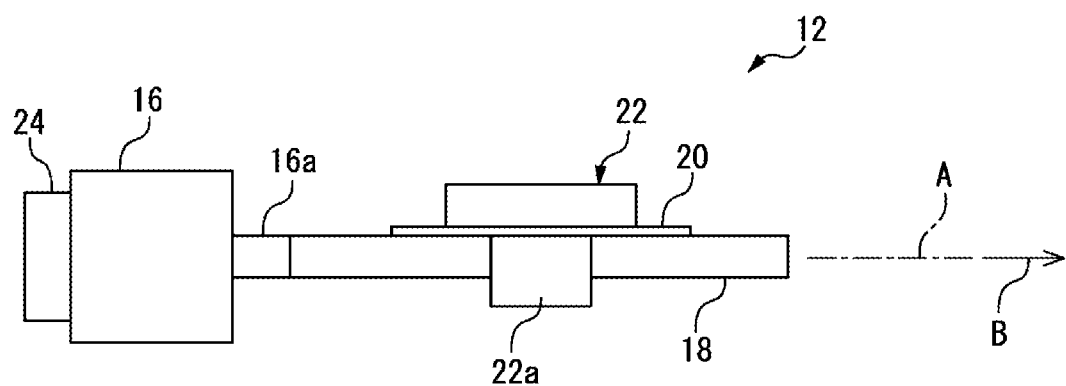
FIG. 2 illustrates a schematic view of the industrial machine illustrated in FIG. 1.

The motor 16 is provided with at least one sensor 24 (FIG. 1). For example, the sensor 24 has a rotation detection sensor (encoder, Hall element, and the like) that detects a rotational position P of the output shaft 16a, a current sensor that detects a current I supplied to the motor 16, and a force sensor (torque sensor) that detects a driving force F (torque) applied to the output shaft 16a by the motor 16.

The sensor 24 detects the rotational position P, the current I, and the driving force F, and supplies them to the control device 14 as position feedback P, current feedback I, and force feedback F, respectively. Note that the sensor 24 may detect acceleration α of the output shaft 16a (or the driven body 22) and supply a detection value as acceleration feedback α to the control device 14, or may supply, to the control device 14, the acceleration feedback α obtained by second derivative of the position feedback P with respect to time.

The control device 14 controls the industrial machine 12 (specifically, the motor 16). As illustrated in FIG. 1, the control device 14 is a computer including a processor 30, a memory 32, and an I/O interface 34. The processor 30 includes a CPU or a GPU, and is communicably connected to the memory 32 and the I/O interface 34 via a bus 36. The processor 30 performs calculation processing for achieving a command correction function described later while communicating with the memory 32 and the I/O interface 34.

The memory 32 includes a RAM or a ROM, and temporarily or permanently stores various data used in calculation processing for a command correction function executed by the processor 30 and various data generated in the middle of the calculation processing. The I/O interface 34 includes, for example, an Ethernet (trade name) port, a USB port, an optical fiber connector, or a HDMI (trade name) terminal and performs wired or wireless data communication with an external device in accordance with a command from the processor 30.

The processor 30 generates a command CM for driving the motor 16 so as to accelerate. This command CM includes, for example, a position command CMp, a velocity command CMv, and a torque command CMτ. The position command CMp defines a target position of the driven body 22 (i.e., the output shaft 16a of the motor 16), the velocity command CMv defines a velocity V of the motor 16 (or the driven body 22), and the torque command CMT defines the driving force F (torque) of the motor 16.

Note that the command CM may have an acceleration command CMα that defines the acceleration α of the output shaft 16a of the motor 16 (or the driven body 22) instead of the torque command CMτ. As described above, in the present embodiment, the processor 30 functions as a command generating section 40 (FIG. 1) that generates the command CM.

The motor 16 generates the driving force F (torque) for rotationally driving the output shaft 16a in response to the command CM. The driving force F generated by the motor 16 acts on the elastic element 18 and then acts on the elastic element 20 to drive the driven body 22. The elastic elements 18 and 20 can be regarded as springs that are slightly elastically deformed by the action of the driving force F.

Figure 3:
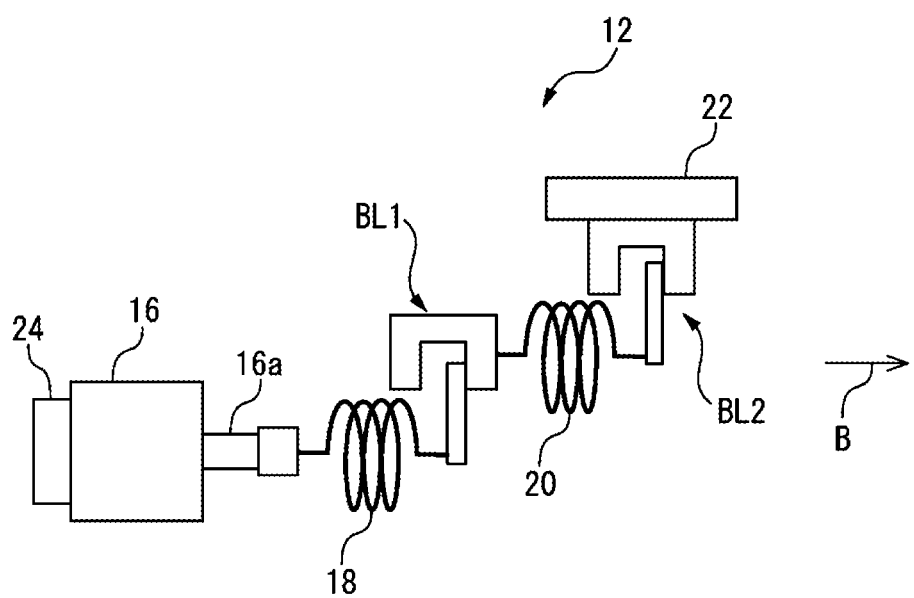
FIG. 3 illustrates a machine model of the industrial machine illustrated in FIG. 2.

FIG. 3 illustrates a schematic mechanical system model of the industrial machine 12. As illustrated in FIG. 3, the industrial machine 12 can be schematically expressed as a mechanical system model in which the elastic elements 18 and 20 as springs are interposed between the motor 16 and the driven body 22. As illustrated in FIG. 3, in the mechanical system model of the industrial machine 12, a backlash element BL1 exists between the elastic element 18 and the elastic element 20.

The backlash element BL1 on the mechanical system model represents a backlash between the output shaft 16a and the elastic element 18 and a backlash between the elastic element 18 and the driven body 22 (engagement part 22a). On the other hand, a backlash element BL2 exists between the elastic element 18 and the elastic element 20. The backlash element BL2 on the mechanical system model represents a backlash between the elastic element 20 and the driven body 22.

Here, it is assumed that the processor 30 generates the command CM for accelerating the motor 16 after reversing an operation direction of the motor 16 (i.e., the rotation direction of the output shaft 16a) from one side to the other, and by the command CM, the movement direction of the driven body 22 reverses from rightward to leftward to accelerate the driven body 22 leftward. In this case, the motor 16 generates the driving force F (torque) in response to the command CM.

Figure 4:
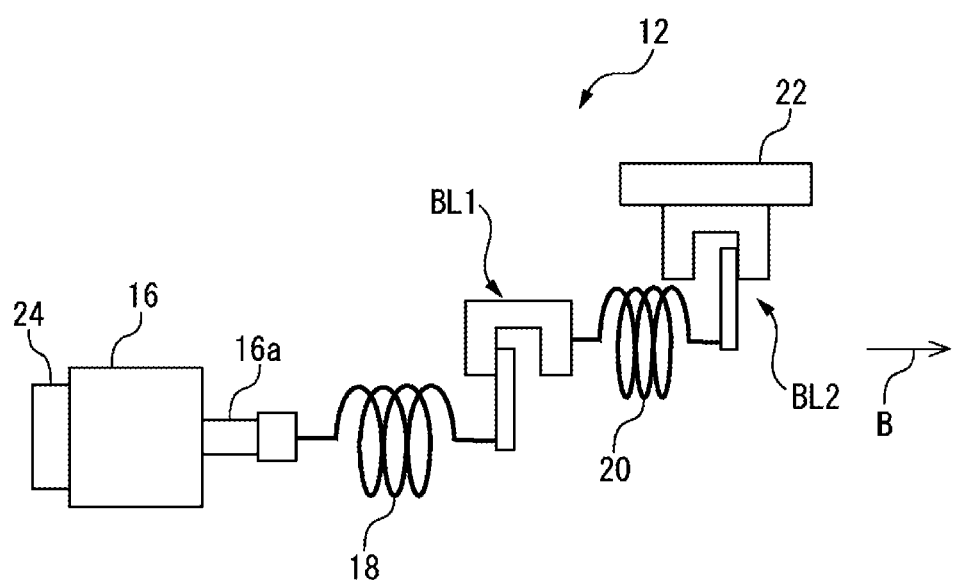
FIG. 4 illustrates a first stage in which a driving force of a motor acts on a first elastic element in the machine model illustrated in FIG. 3.

This driving force F first acts on the elastic element 18, and, by the above-described backlash element BL1, a minute time lag TL1 is generated from when the driving force F acts on the elastic element 18 to when the elastic element 18 is elastically deformed (on the machine model, the spring of the elastic element 18 is stretched). When the time lag TL1 elapses after the driving force F acts on the elastic element 18 (i.e., when the backlash element BL1 is eliminated), as illustrated in FIG. 4, the elastic element 18 starts to be elastically deformed (i.e., the spring is stretched) by the driving force F acting on the elastic element 18.

Figure 5:
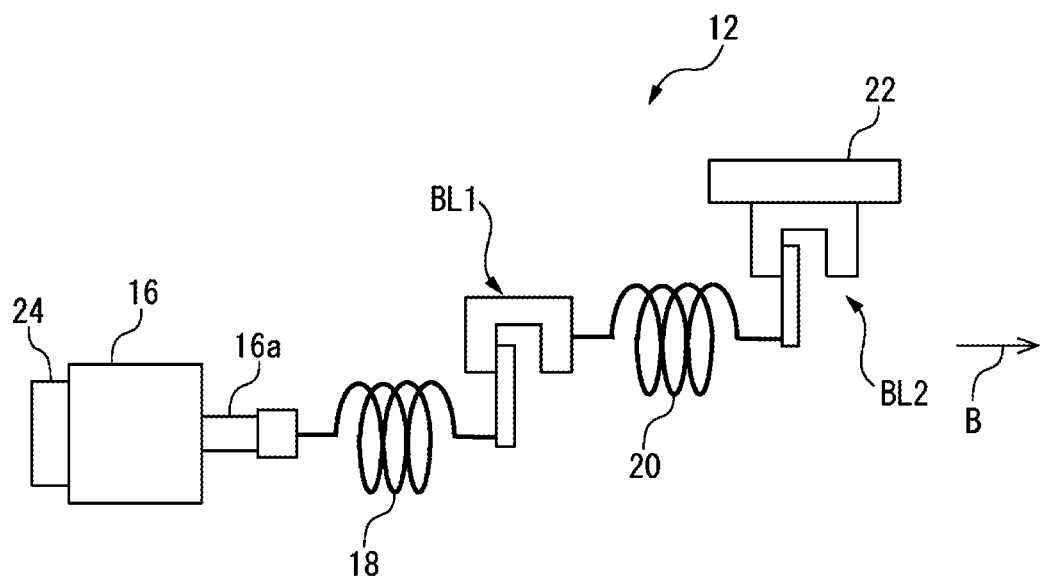
FIG. 5 illustrates a second stage in which the driving force of the motor acts on a second elastic element through the first elastic element in the machine model illustrated in FIG. 3.

On the other hand, by the above-described backlash element BL2, a minute time lag TL2 is generated from when the elastic element 18 is elastically deformed to when the driving force F elastically deforms the elastic element 20 (i.e., the spring of the elastic element 20 is stretched). When the time lag TL2 elapses after the elastic element 18 is elastically deformed (i.e., when the backlash element BL2 is eliminated), as illustrated in FIG. 5, the elastic element 20 starts to be elastically deformed by the driving force F acting on the elastic element 20. Then, the driven body 22 starts to move leftward while receiving the force (stress and frictional force) from the elastic element 20.

As described above, in the industrial machine 12, there is a stage ST1 (FIG. 4) in which the driving force F generated by the motor 16 acts on the elastic element 18 to elastically deform the elastic element 18, and in this stage ST1, the driving force F does not substantially act on the elastic element 20 due to the influence of the backlash element BL2. That is, in this stage ST1, it can be regarded that only the spring of the elastic element 18 exists in the machine model of the industrial machine 12, and thus, it is necessary to take only the elastic parameter PR1 into account.

Then, the industrial machine 12 transitions from the stage ST1 to a stage ST2 (FIG. 5) in which the driving force F acts on the elastic element 20 through the elastic element 18 to elastically deform the elastic element 20. In this stage ST2, since the driving force F acts on the elastic elements 18 and 20, it can be regarded that a combined spring of the elastic elements 18 and 20 exists in the machine model of the industrial machine 12, and thus, it is necessary to take the elastic parameters PR1 and PR2 into account.

Thus, the driven body 22 is driven by the driving force F through the plurality of stages ST1 and ST2 in which the driving force F acts on the plurality of elastic elements 18 and 20 in stages. When the motor 16 generates the driving force F in accordance with the command CM, the elastic elements 18 and 20 are elastically deformed in stages, whereby a delay is caused in start of leftward movement of the driven body 22, and as a result, an error ε occurs between the position command CMp constituting the command CM and an actual position of the driven body 22 (specifically, the rotational position of the motor 16).

In order to cancel such the error ε, the processor 30 executes correction amount calculation processing CP of obtaining a correction amount β for correcting the command CM based on the elastic parameters PR of the elastic elements 18 and 20. Thus, in the present embodiment, the processor 30 functions as a correction amount calculating section 42 (FIG. 1) that executes the correction amount calculation processing CP. Note that details of the correction amount calculation processing CP will be described later.

Figure 6:
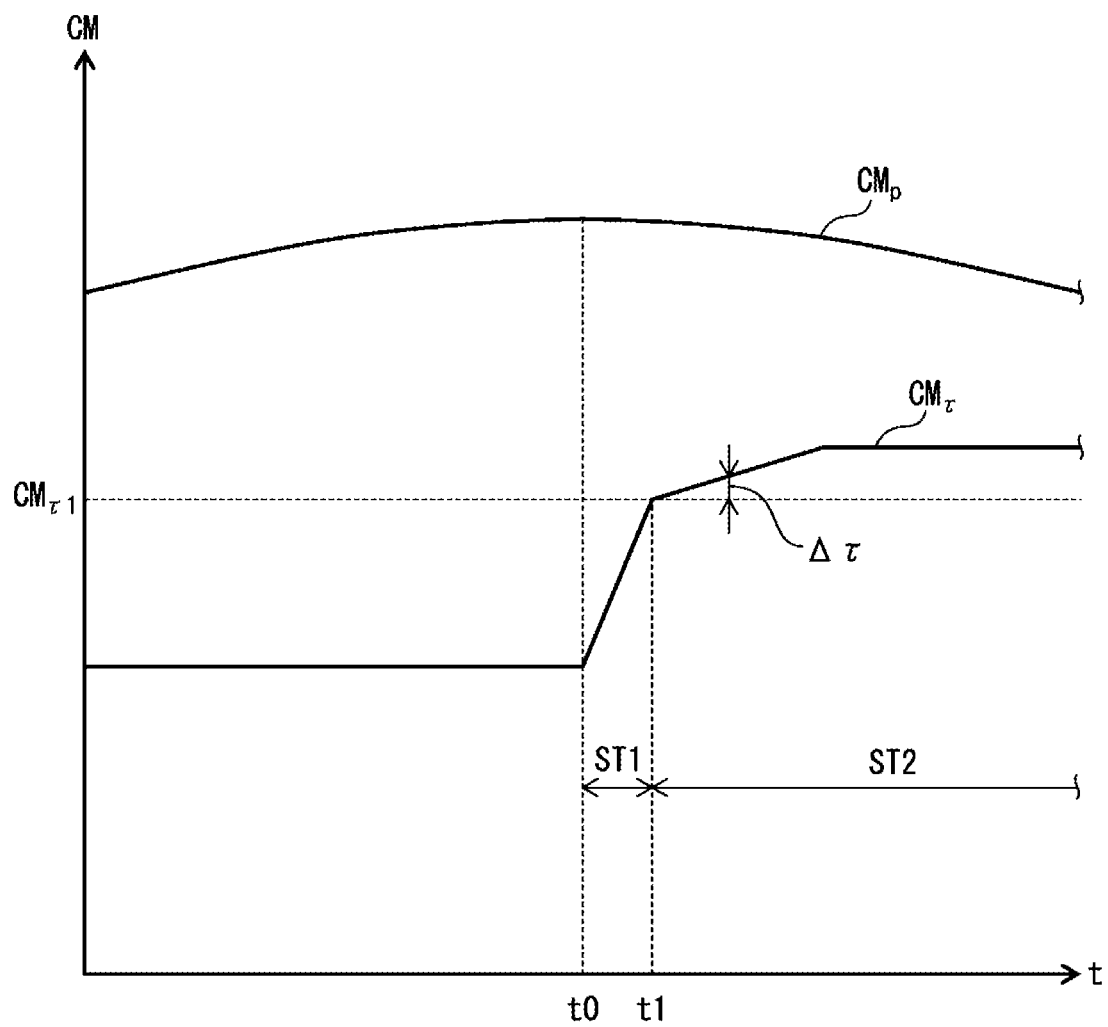
FIG. 6 illustrates an example of a time change characteristic of a command for operating the motor.

FIG. 6 illustrates an example of the time change characteristics of the position command CMp and the torque command CMt included in the command CM when the motor 16 is accelerated in accordance with the command CM as described above and the driven body 22 is moved as described with reference to FIG. 3 to FIG. 5. The position command CMp illustrated in FIG. 6 represents that the operation direction of the motor 16 (or the driven body 22) is reversed at time t0.

On the other hand, a degree D of change of the torque command CMτ with respect to time t is relatively steep in the period from the time t0 to time t1, and is relatively gentle in the period in and after the time $t_1$. The period from the time t0 to the time t1 corresponds to the above-described stage ST1, while the period in and after the time t1 corresponds to the above-described stage ST2.

Note that the driving force F generated by the motor 16 in response to the command CM is highly correlated with the torque command CMτ, the force feedback F, the acceleration feedback α (or the acceleration command CMα), and the current feedback I. Thus, the torque command CMτ, the force feedback F, the acceleration feedback α, the acceleration command CMα, and the current feedback I can be regarded as a force parameter FP indicating the driving force F. Thus, the time change characteristics of the force feedback F, the acceleration α, the acceleration command CMα, and the current feedback I are similar to the time change characteristic of the torque command CMτ (in other words, the driving force F) illustrated in FIG. 6.

In the present embodiment, the processor 30 detects the transition from the stage ST1 to the stage ST2 in order to execute the correction amount calculation processing CP1 and CP2 different between the stage ST1 and the stage ST2 while the motor 16 is in operation. Specifically, the processor 30 acquires the degree D of change of the force parameter FP (the torque command CMτ, the acceleration command CMα, the force feedback F, the acceleration α, the acceleration feedback α, or the current feedback I), and detects the transition from the stage ST1 to the stage ST2 based on the degree D of change.

As an example, the processor 30 acquires a gradient D1 (=δCMτ/δt) of the torque command CMτ (FIG. 6) as the degree D of change. For example, when generating the command CM in a control cycle Tc (e.g., 50 [msec]), the processor 30 may obtain a difference D2 (=$CMτ_n - CMτ_{n-1}$) between a most recently generated torque command $CMτ_n$ and a torque command $CMτ_{n-1}$ generated immediately before the torque command $CMτ_n$, and divide the difference D2 by the control cycle Tc, thereby obtaining the gradient D1 (=D2/Tc=($CMτ_n - CMτ_{n-1}$)/Tc).

Alternatively, the processor 30 may acquire the above-described difference D2 (=$CMτ_n - CMτ_{n-1}$) as the degree D of change. It should be understood that also for the acceleration command CMα, similarly to the torque command CMt, the processor 30 can acquire, as the degree D of change, a gradient D3 (=δCMα/δt=($CMα_n - CMα_{n-1}$)/Tc) or a difference D4 (=$CMα_n - CMα_{n-1}$) of the acceleration command CMα.

As another example, the processor 30 acquires a gradient D5 (=δF/δt) of the force feedback F as the degree D of change. For example, the processor 30 acquires the force feedback F from the sensor 24 in a control cycle Tc. Then, the processor 30 may obtain a difference D6 (=$F_n - F_{n-1}$) between the most recently acquired force feedback $F_n$ and the force feedback $F_{n-1}$ acquired immediately before the force feedback $F_n$, and divide the difference D6 by the control cycle Tc, thereby obtaining the gradient D5 (=D6/Tc=($F_n - F_{n-1}$)/Tc).

Alternatively, the processor 30 may acquire the above-described difference D6 (=$F_n - F_{n-1}$) as the degree D of change. It should be understood that similarly to the force feedback $F_n$, the processor 30 can also acquire the current feedback I from the sensor 24 in the control cycle Tc, and acquire a gradient D7 (=δI/δt=($I_n - I_{n-1}$)/Tc) of the current feedback I or a difference D8 (=$I_n - I_{n-1}$) as the degree D of change.

As yet another example, the processor 30 may acquire a gradient D9 of the acceleration feedback α (i.e., a jerk degree) as the degree D of change. Specifically, the processor 30 acquires the position feedback P from the sensor 24 in the control cycle Tc, obtains a difference (=$P_n-P_{n-1}$) between the most recently acquired position feedback $P_n$ and the position feedback $P_{n-1}$ generated immediately before the position feedback $P_n$, and divides the difference by the control cycle Tc, thereby obtaining velocity feedback $V_n$ (=($P_n-P_{n-1}$)/Tc).

Subsequently, the processor 30 obtains a difference (=$V_n-V_{n-1}$) between the most recently acquired velocity feedback $V_n$ and velocity feedback $V_{n-1}$ generated immediately before the velocity feedback $V_n$, and divides the difference by the control cycle Tc, thereby obtaining the acceleration feedback $α_n$ (=($V_n-V_{n-1}$)/Tc).

Subsequently, the processor 30 obtains a difference D10 (=$α_n-α_{n-1}$) between the most recently acquired acceleration feedback an and acceleration feedback $α_{n-1}$ generated immediately before the acceleration feedback $α_n$, and divides the difference D10 by the control cycle Tc, thereby obtaining the gradient D9 (=D10/Tc=($α_n-α_{n-1}$)/Tc) of the acceleration feedback α. Alternatively, the processor 30 may acquire the above-described difference D10 as the degree D of change of the acceleration feedback α.

As described above, the processor 30 functions as a change acquiring section 44 (FIG. 1) configured to acquire the degree D of change (D1 to D10) of the force parameter FP (specifically, the torque command CMτ, the acceleration command CMτ, the force feedback F, the current feedback I, or the acceleration feedback α).

Subsequently, the processor 30 determines whether or not the degree D of change having been acquired has exceeded a predetermined standard $D_{th}$. For example, when acquiring the gradient D1 of the torque command CMτ as the degree D of change, the processor 30 determines that the degree D of change has exceeded the standard $D_{th}$ when the gradient D1 decreases beyond a predetermined standard value $D_{th1}$ (D1<$D_{th1}$).

This standard value $D_{th1}$ can be determined in advance as, for example, a value ($D1_{-2}$<$D_{th1}$<$D1_{-1}$) between the gradient $D1_{-1}$ of the torque command CMτ in the stage ST1 illustrated in FIG. 6 and the gradient $D1_{-2}$ of the torque command CMτ in the stage ST2. It should be understood that the processor 30 can determine whether or not the other degrees D2 to D10 of change have exceeded the standard $D_{th}$ by a similar method.

When determining that the degree D of change has exceeded the standard $D_{th}$, the processor 30 detects the transition from the stage ST1 to the stage ST2 (in other words, the timing of the time t1). As described above, in the present embodiment, the processor 30 functions as a stage detecting section 46 (FIG. 1) that detects the transition from the stage ST1 to the stage ST2.

When detecting the transition from the stage ST1 to the stage ST2 as described above, the processor 30 switches the correction amount calculation processing CP to be executed from the correction amount calculation processing CP1 based on the elastic parameter PR1 of the elastic element 18 to the correction amount calculation processing CP2 based on the elastic parameter PR1 and the elastic parameter PR2 of the elastic element 20.

Specifically, the processor 30 functions as the correction amount calculating section 42, and executes the correction amount calculation processing CP1 in the stage ST1 (the period from the time t0 to the time t1 in FIG. 6), and, in the correction amount calculation processing CP1, obtains a correction amount β1 relating to the elastic element 18 using the spring constant k1 as the elastic parameter PR1 of the elastic element 18 and the force parameter FP. As an example, in the correction amount calculation processing CP1, the processor 30 acquires the correction amount β1 by substituting the spring constant k1 and the most recently acquired torque command CMτ into the following Expression (1).

$$B1 = CMT/K1 \qquad (1)$$

This Expression (1) is so-called Hooke's law, and the correction amount calculation processing CP1 according to the present embodiment is based on a machine model in which the elastic element 18 is likened to one spring as illustrated in FIG. 3 to FIG. 5. The spring constant k1 is determined in advance as a proportional coefficient between the force (torque) applied to the elastic element 18 by the motor 16 in the industrial machine 12 and the elastic deformation amount in the direction of the axis A of the elastic element 18 due to the force, and is stored in the memory 32.

The correction amount β1 obtained from the above Expression (1) is for canceling an error ε1 caused by the elastic deformation of the elastic element 18 in the stage ST1 (FIG. 4). Thus, by executing the correction amount calculation processing CP1 in the stage ST1, the processor 30 obtains the correction amount β1 relating to the elastic element 18.

Then, in the stage ST1, the processor 30 corrects the command CM with the obtained correction amount β1. Specifically, since the correction amount β1 is a parameter having the same dimension as the rotational position P of the motor 16 (or the position of the driven body 22), the processor 30 applies the correction amount β1 to the position command CMp, thereby correcting the position command CMp. For example, the processor 30 may correct the position command CMp by adding the correction amount β1 to the position command CMp (CMp+β1). Alternatively, the correction amount β1 may be converted into the rotational position of the output shaft 16a of the motor 16 and the converted correction amount β1 may be added to the position command CMp.

On the other hand, in the stage ST2 (the period in and after the time t1 in FIG. 6), the processor 30 functions as the correction amount calculating section 42 and executes the correction amount calculation processing CP2. As an example of the correction amount calculation processing CP2, the processor 30 first acquires the torque command $CMτ_1$ (FIG. 6) at the time point when the transition from the stage ST1 to the stage ST2 is detected (time t1 in FIG. 6).

Thereafter, the processor 30 acquires a difference Δt (=$CMτ-CMτ_1$) between the most recently acquired torque command CMτ and the above-described torque command $CMτ_1$, and acquires a correction amount β1' by substituting the spring constant k1 of the elastic element 18 and the most recently acquired Δτ into the following Expression (2).

$$B1' = ΔT/K1 \qquad (2)$$

This Expression (2) also indicates the Hooke's law as with Expression (1) described above, and this correction amount β1' is for canceling the error ε1 caused by the elastic deformation of the elastic element 18 in the stage ST2 (FIG. 5). Hereinafter, the significance of using the difference Δτ instead of the torque command CMτ to obtain the correction amount β1' will be described.

Upon transition from the stage ST1 (FIG. 4) to the stage ST2 (FIG. 5), the driving force F generated by the motor 16 is affected by frictional force (resistance on an equivalent circuit) or the like in the backlash elements BL1 and BL2. As a result, the force that elastically deforms the elastic elements 18 and 20 (i.e., stretches the spring) in the stage ST2 will be reduced below the driving force F. Thus, by approximating the force that elastically deforms the elastic elements 18 and 20 in the stage ST2 with the above-described difference Δt, it is possible to more accurately evaluate the elastic deformation amount (in other words, the correction amount) of the elastic elements 18 and 20 in the stage ST2.

In addition to obtaining the above-described correction amount β1', the processor 30 obtains a correction amount β2 by substituting the spring constant k2 as the elastic parameter PR2 of the elastic element 20 and the most recently acquired difference Δτ into the following Expression (3).

$$B2 = \Delta T/K2 \qquad (3)$$

This Expression (3) also indicates the Hooke's law similarly to Expression (2) described above, and the correction amount calculation processing CP2 according to the present embodiment is based on a machine model in which the elastic element 20 is likened to one spring. The spring constant k2 is determined in advance as a proportional coefficient between the force (torque) applied to the elastic element 20 by the motor 16 in the industrial machine 12 and the elastic deformation amount in the direction of the axis A of the elastic element 20 due to the force, and is stored in the memory 32. The correction amount β2 is for canceling an error ε2 caused by the elastic deformation of the elastic element 20 in the stage ST2 (FIG. 5).

Then, the processor 30 obtains a sum Σβn (=β1'+β2) of the obtained correction amounts β1' and β2, and acquires the sum ΣBn as a correction amount β3 (=Σβn=Δτ(1/k1+1/k2)) relating to the elastic elements 18 and 20. This correction amount β3 is for canceling an error ε3 caused by elastic deformation of the combined spring of the elastic elements 18 and 20 in the stage ST2.

As another example of the correction amount calculation processing CP2, the processor 30 obtains the correction amount β3 relating to the elastic elements 18 and 20 using a combined spring constant Ks of the elastic elements 18 and 20 and the torque commands CMτ$_1$ and CMτ as the force parameters FP. Here, in the case of a machine model in which the elastic elements 18 and 20 are connected in series as illustrated in FIG. 3 to FIG. 5, the combined spring constant Ks and the spring constants k1 and k2 satisfy the following Expression (4).

$$1/KS = 1/K1 + 1/K2 \qquad (4)$$

From this Expression (4), the combined spring constant Ks is determined in advance as ks=k1·k2/(k1+k2) and stored in the memory 32. The processor 30 acquires the difference Δτ between the most recently acquired torque command CMτ and the torque command CMτ$_1$, and acquires the correction amount β3 relating to the elastic elements 18 and 20 by substituting the difference Δτ and the combined spring constant Ks into the following Expression (5).

$$B3 = \Delta T/KS = \Delta T(1/K1 + 1/K2) \qquad (5)$$

This Expression (5) also indicates the Hooke's law and is based on a machine model in which the elastic elements 18 and 20 are likened to one combined spring. As described above, by executing the correction amount calculation processing CP2 in the stage ST2, the processor 30 obtains the correction amount β3 relating to the elastic elements 18 and 20. Then, in the stage ST2, similarly to the stage ST1, the processor 30 corrects the position command CMp by applying (e.g., adding) the obtained correction amount β3 to the position command CMp.

As described above, the processor 30 functions as the correction amount calculating section 42, executes the correction amount calculation processing CP1 based on the elastic parameter PR1 (the spring constant k1) in the stage ST1, and, when detecting the transition from the stage ST1 to the stage ST2, switches from the correction amount calculation processing CP1 to the correction amount calculation processing CP2 based on the elastic parameters PR1 (the spring constant k1) and PR2 (the spring constant k2). Thus, in the stages ST1 and ST2, the processor 30 corrects the position command CMp with the obtained correction amounts β1 and β3, respectively.

Figure 7:
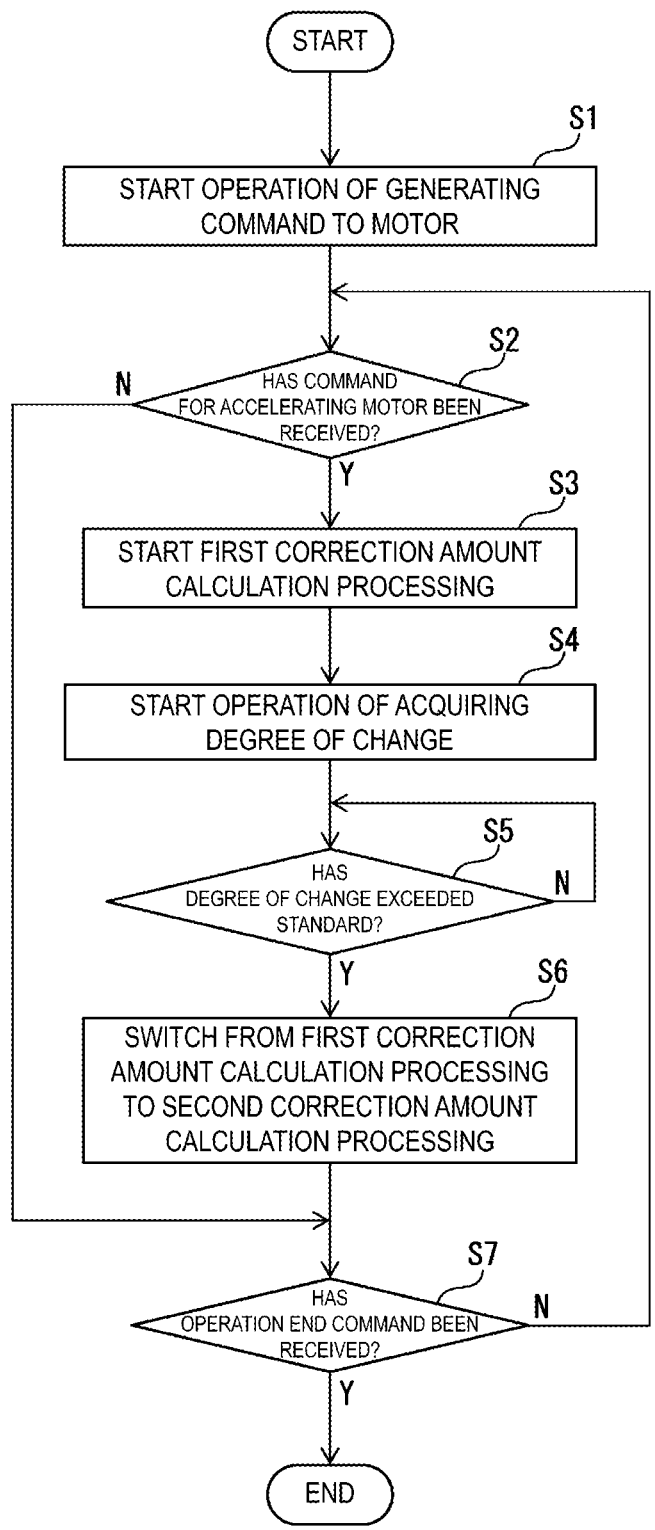
FIG. 7 is a flowchart illustrating an example of an operation flow of a control device illustrated in FIG. 1.

Hereinafter, a detailed flow of command correction processing executed by the processor 30 will be described with reference to FIG. 7. The flow illustrated in FIG. 7 starts when the processor 30 receives an operation start command from an operator, a host controller, or an operation program. In step S1, the processor 30 starts operation of generating the command CM to the motor 16 in response to the operation program. The motor 16 drives the driven body 22 in accordance with the command CM, whereby the industrial machine 12 executes predetermined work on the workpiece.

In step S2, the processor 30 determines whether or not there is the command CM for driving the motor 16 so as to accelerate. For example, this command CM is a command for accelerating the motor 16 after reversing the operation direction of the motor 16. Alternatively, this command CM may be a command for rapidly accelerating the motor 16 in a stopped state (or a low-velocity movement state). When the motor 16 is operated in accordance with the command CM for such acceleration, the driving force F acts on the plurality of elastic elements 18 and 20 in stages as illustrated in FIG. 3 to FIG. 5, whereby the above-described plurality of stages ST1 and ST2 are sequentially caused.

For example, by analyzing the operation program, the processor 30 can recognize whether or not there is the command CM for accelerating (e.g., reversing and accelerating) the motor 16. The processor 30 proceeds to step S3 when determining YES, and proceeds to step S7 when determining NO. From the time point when YES is determined in this step S2 (corresponding to the time t0 in FIG. 6), the motor 16 starts acceleration, and accordingly, the state of the industrial machine 12 transitions to the stage ST1.

In step S3, the processor 30 starts the correction amount calculation processing CP1. Specifically, the processor 30 obtains the correction amount β1 relating to the elastic element 18 using the elastic parameter PR1 (the spring constant k1) of the elastic element 18 and the force parameter FP (the torque command CMt) by the above-described method. Then, the processor 30 corrects the command CM with the obtained correction amount β1. A series of operations of calculation of this correction amount β1 and correction of the command CM is repeatedly executed during the stage ST1, for example, in the control cycle Tc (or a cycle of an integer multiple of the control cycle Tc).

In step S4, the processor 30 starts operation of acquiring the degree D of change in the force parameter FP with respect to the time t. Specifically, the processor 30 repeatedly acquires, for example, the gradient D1 of the torque command CMτ as the degree D of change in the control cycle Tc (or a cycle of an integer multiple of the control cycle Tc) by the above-described method.

In step S5, the processor 30 determines whether or not the most recently acquired degree D of change has exceeded the predetermined standard $D_{th}$. For example, when acquiring the gradient D1 in step S4, the processor 30 determines whether or not the gradient D1 has decreased beyond the standard value $D_{th1}$. The processor 30 proceeds to step S6 when determining YES, and loops step S5 when determining NO. At the time point when YES is determined in this step S5 (corresponding to the time t1 in FIG. 6), the state of the industrial machine 12 can be regarded as having transitioned from the stage ST1 to the stage ST2.

In step S6, the processor 30 switches from the correction amount calculation processing CP1 to the correction amount calculation processing CP2. Specifically, the processor 30 obtains the correction amount β3 using the elastic parameters PR1 and PR2 of the elastic elements 18 and 20 (the spring constants k1 and k2 or the combined spring constant Ks) and the force parameter FP (the torque command CMτ and the torque command $CMτ_1$) by the above-described method. Then, the processor 30 corrects the command CM with the obtained correction amount β3. A series of operations of calculation of this correction amount β3 and correction of the command CM is repeatedly executed during the stage ST2, for example, in the control cycle Tc (or a cycle of an integer multiple of the control cycle Tc).

In step S7, the processor 30 determines whether or not an operation end command has been received from the operator, the host controller, or the operation program. The processor 30 ends the flow illustrated in FIG. 7 when determining YES and returns to step S2 when determining NO.

As described above, in the present embodiment, the stage detecting section 46 detects the transition from the stage ST1 to the stage ST2, and the correction amount calculating section 42 switches the correction amount calculation processing CP to be executed from the correction amount calculation processing CP1 based on the elastic parameter PR1 to the correction amount calculation processing CP2 based on the elastic parameters PR1 and PR2 when the transition from the stage ST1 to the stage ST2 is detected.

In other words, the processor 30 switches the elastic parameters PR1 and PR2 used for acquiring the correction amount β in response to the stages ST1 and ST2 in which the driving force F generated by the motor 16 sequentially acts on the plurality of elastic elements 18 and 20. According to this configuration, it is possible to obtain the correction amounts β1 and β3 suitable for the respective stages ST1 and ST2.

Thus, since the industrial machine 12 in which the motor 16 and the driven body 22 are coupled via the plurality of elastic elements 18 and 20 can highly accurately cancel the error ε caused by the staged elastic deformation of the elastic elements 18 and 20, it is possible to greatly improve the positioning accuracy of the driven body 22 by the motor 16.

In the present embodiment, the change acquiring section 44 acquires the degree D of change (D1 to D10) of the force parameter FP with respect to the time t, and the stage detecting section 46 detects the transition from the stage ST1 to the stage ST2 when the acquired degree D of change exceeds the standard $D_{th}$. Here, since the transition from the stage ST1 to the stage ST2 remarkably appears as a change in the force parameter FP (e.g., FIG. 6), the transition from the stage ST1 to the stage ST2 can be highly accurately detected in real time by monitoring the degree D of change.

In the present embodiment, the change acquiring section 44 acquires, as the degree D of change, the gradient D1, D3, D5, D7, or D9 of the force parameter D (e.g., the torque command CMτ, the acceleration command CMα, the force feedback F, the current feedback I, or the acceleration feedback α). According to this configuration, it is possible to detect the transition from the stage ST1 to the stage ST2 with higher accuracy.

In the present embodiment, the command generating section 40 generates the command CM for accelerating the motor 16 after reversing (the time t0 in FIG. 6) the operation direction of the motor 16 (i.e., the driven body 22), whereby the state of the industrial machine 12 transitions to the stage ST2 through the stage ST1.

Here, the transition from the stage ST1 to the stage ST2 described with reference to FIG. 3 to FIG. 5 remarkably appears when the motor 16 (the driven body 22) is accelerated after the operation direction of the motor 16 is reversed. That is, the time of reversing the motor 16, the error ε (ε1, ε2, or ε3) is significantly caused. According to the present embodiment, it is possible to effectively cancel the error ε caused at the time of reversing the motor 16, and as a result, it is possible to effectively improve the positioning accuracy at the time of reversing the motor 16.

Note that in the present embodiment, a case is described, in which the difference Δτ is used in the above Expressions (2), (3), and (5), taking into account the influence of the frictional force or the like at the backlash elements BL1 and BL2. However, the processor 30 may substitute the most recently acquired torque command CMτ instead of the difference Δτ in the above Expressions (2), (3), and (5).

Regarding the above-described Expression (1), the processor 30 may obtain the correction amount β1 by substituting the torque command CMτ into the Expression (1) after correcting the torque command CMτ so as to remove the influence of inertia or the like of the elastic element 18. Regarding the above Expressions (2), (3), and (5), the processor 30 may obtain the correction amount β3 by substituting the torque command CMτ into Expressions (2) and (3) or Expression (5) after correcting the torque command CMτ so as to remove the influence of inertia or the like of the elastic elements 18 and 20.

The processor 30 may substitute a value obtained by multiplying the acceleration feedback α by mass m1 of the elastic element 18: α×m1, instead of the torque command CMτ in the above-described Expression (1). Similarly, in the above Expressions (2) and (3) or Expression (5), the processor 30 may substitute a value obtained by multiplying the acceleration feedback α by the sum of the mass m1 of the elastic element 18 and mass m2 of the elastic element 20: (m1+m2)α, instead of the torque command CMτ (and $CMτ_1$).

In the present embodiment, a case is described in which the industrial machine 12 is approximated as a machine model in which two springs (the elastic elements 18 and 20)

are connected in series as illustrated in FIG. 3 to FIG. 5, and then the correction amount β is obtained from Expressions (1) to (5) based on the Hooke's law. However, the above-described Expressions (1) to (5) are examples, and it is also possible to approximate the industrial machine 12 as a more complicated machine model using, for example, the elastic moduli G1 and G2 as the elastic parameters PR1 and PR2, and to obtain the correction amount β based on a theoretical formula representing the complicated machine model.

Figure 8:
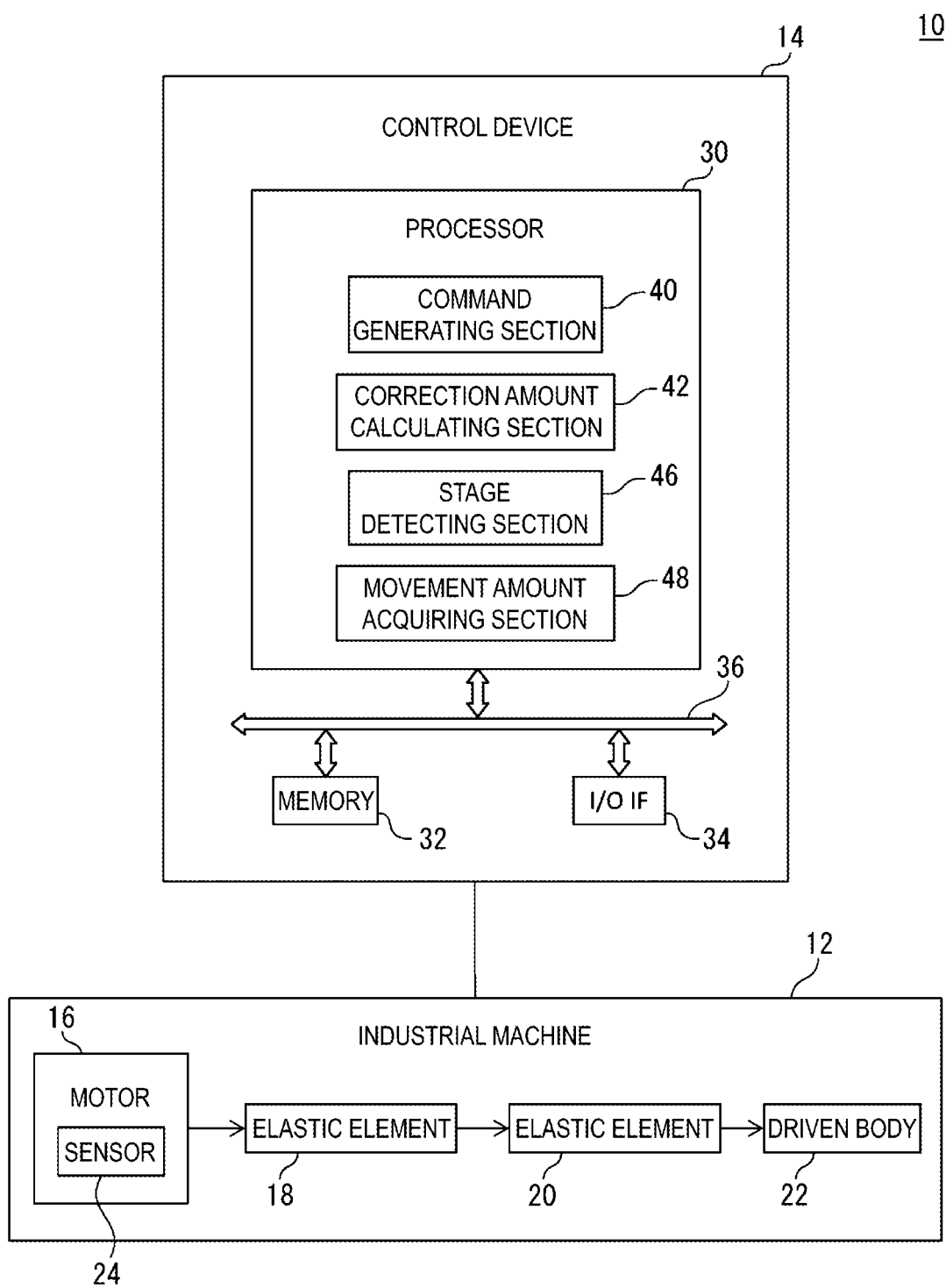
FIG. 8 is a block diagram illustrating another function of the control device illustrated in FIG. 1.

Subsequently, another function of the control device 14 will be described with reference to FIG. 8 and FIG. 9. In the present embodiment, the processor 30 functions as a movement amount acquiring section 48 instead of the change acquiring section 44 described above. Hereinafter, the function of the control device 14 according to the present embodiment will be described with reference to FIG. 9. Note that in the flow illustrated in FIG. 9, the same processing as in the flow of FIG. 7 are denoted by the same step numbers, and redundant descriptions are omitted.

Figure 9:
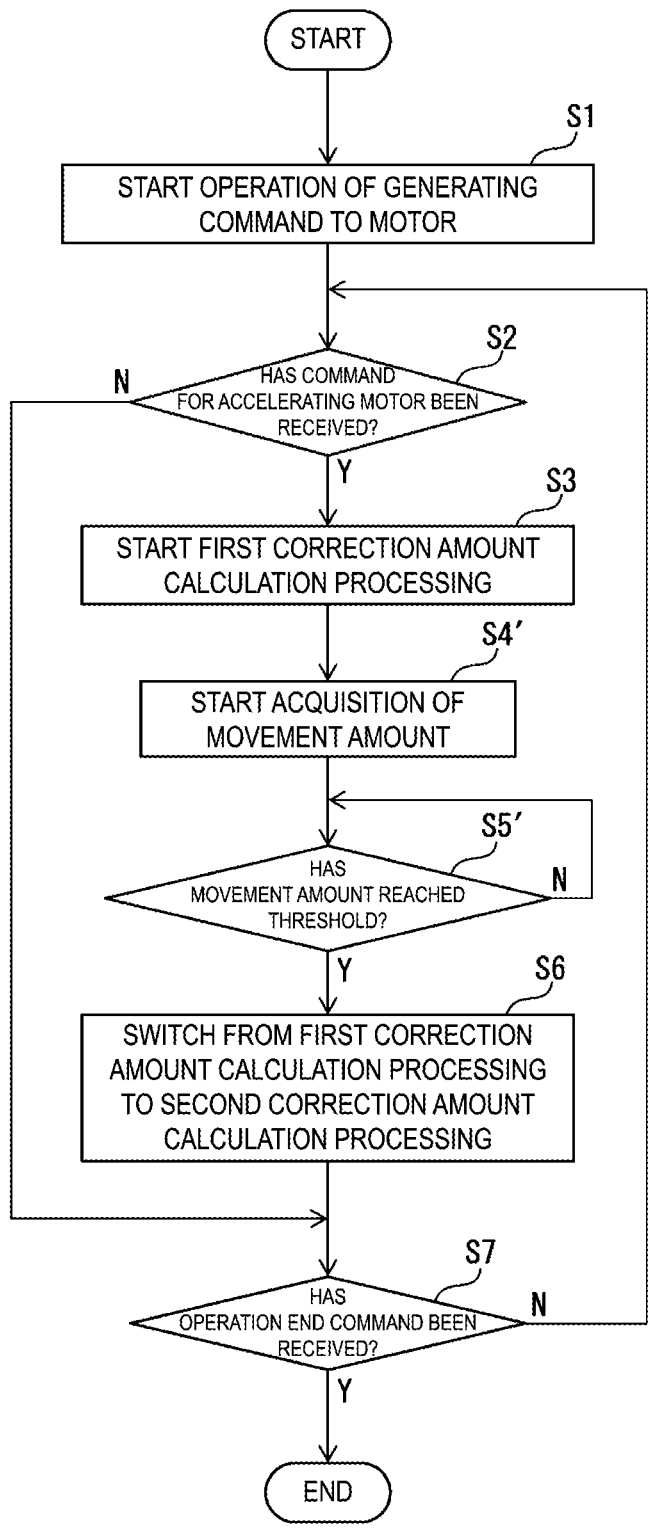
FIG. 9 is a flowchart illustrating an example of an operation flow of the control device illustrated in FIG. 8.

After starting the flow illustrated in FIG. 9, the processor 30 executes steps S1 to S3 described above. In step S4', the processor 30 starts processing to acquire a movement amount MA of the motor 16 from the time point (the time t0 in FIG. 6) when determining YES in step S2. Here, the time point (the time t0) when YES is determined in step S2 is a time point when the motor 16 starts the operation in accordance with the command CM for accelerating the motor 16 after reversing.

As an example, the processor 30 acquires position feedback Po from the sensor 24 at a start time point of step S4' (i.e., a time point t0 at which YES is determined in step S2). Then, the processor 30 repeatedly acquires the position feedback $P_n$ from the sensor 24 during the stage ST1, for example, in a control cycle Tc.

Every time the processor 30 acquires the position feedback $P_n$, the processor 30 acquires the movement amount $MA_n$ of the motor 16 from the time point t0 based on a difference between the acquired position feedback $P_n$ and the position feedback Po acquired at the start time point t0 of step S4'. This movement amount $MA_n$ may be, for example, a rotation angle of the output shaft 16a of the motor 16, or may be the rotation angle converted into a movement distance in the direction of the axis A. As described above, in the present embodiment, the processor 30 functions as the movement amount acquiring section 48 configured to acquire the movement amount $MA_n$ of the motor 16 from the time point t0.

In step S5', the processor 30 determines whether or not the most recently acquired movement amount $MA_n$ has reached a predetermined threshold $MA_{th}$ ($MA_n \geq MA_{th}$). Here, the movement amount $MA_{th}$ (rotation angle or movement distance) by which the motor 16 moves from the time point t0 to the time point t1 of transition from the stage ST1 to the stage ST2 can be acquired in advance by an experimental method.

In other words, in the machine model illustrated in FIG. 3, the movement amount $MA_{th}$ (rotation angle) of the motor 16 from the time point t0 at which the motor 16 starts the operation of driving the driven body 22 leftward to the time point t1 at which the driving force F acts on the elastic element 20 through the elastic element 18 and the spring of the elastic element 20 starts to stretch can be acquired in advance by an experiment or the like. By using the movement amount $MA_{th}$ acquired in advance in this manner as the threshold $MA_{th}$ and comparing it with the movement amount $MA_n$ acquired in step S4', it is possible to detect the timing (the time t1) of transition from the stage ST1 to the stage ST2.

The processor 30 functions as the stage detecting section 46, determines whether or not the most recently acquired movement amount $MA_n$ has reached the threshold $MA_{th}$ ($MA_n \geq MA_{th}$), proceeds to step S6 when determining YES, and loops step S5' when determining NO. When it is determined to be YES in this step S5', the state of the industrial machine 12 can be regarded as having transitioned from the stage ST1 to the stage ST2. After determining YES in step S5', the processor 30 executes steps S6 and S7 described above.

As described above, in the present embodiment, when the movement amount $MA_n$ acquired by the movement amount acquiring section 48 reaches the predetermined threshold $MA_{th}$, the stage detecting section 46 detects the transition from the stage ST1 to the stage ST2. Here, in the example illustrated in FIG. 6, the degree D of change greatly changes at the time t1. However, if the velocity V of the motor 16 (or the velocity command CMv) or the torque command CMτ (or the acceleration command CMα) is small, a variation amount of the degree D of change (gradient) decreases. In this case, it becomes difficult to detect the transition from the stage ST1 to the stage ST2 from the degree D of change.

In the present embodiment, instead of the degree D of change, the transition from the stage ST1 to the stage ST2 can be detected from the movement amount $MA_n$ of the motor 16. Thus, even when the velocity V (the velocity command CMv), the torque command CMτ, or the acceleration command CMα is small, the transition from the stage ST1 to the stage ST2 can be reliably detected. Note that the processor 30 may execute step S3 after executing step S4'.

Figure 10:
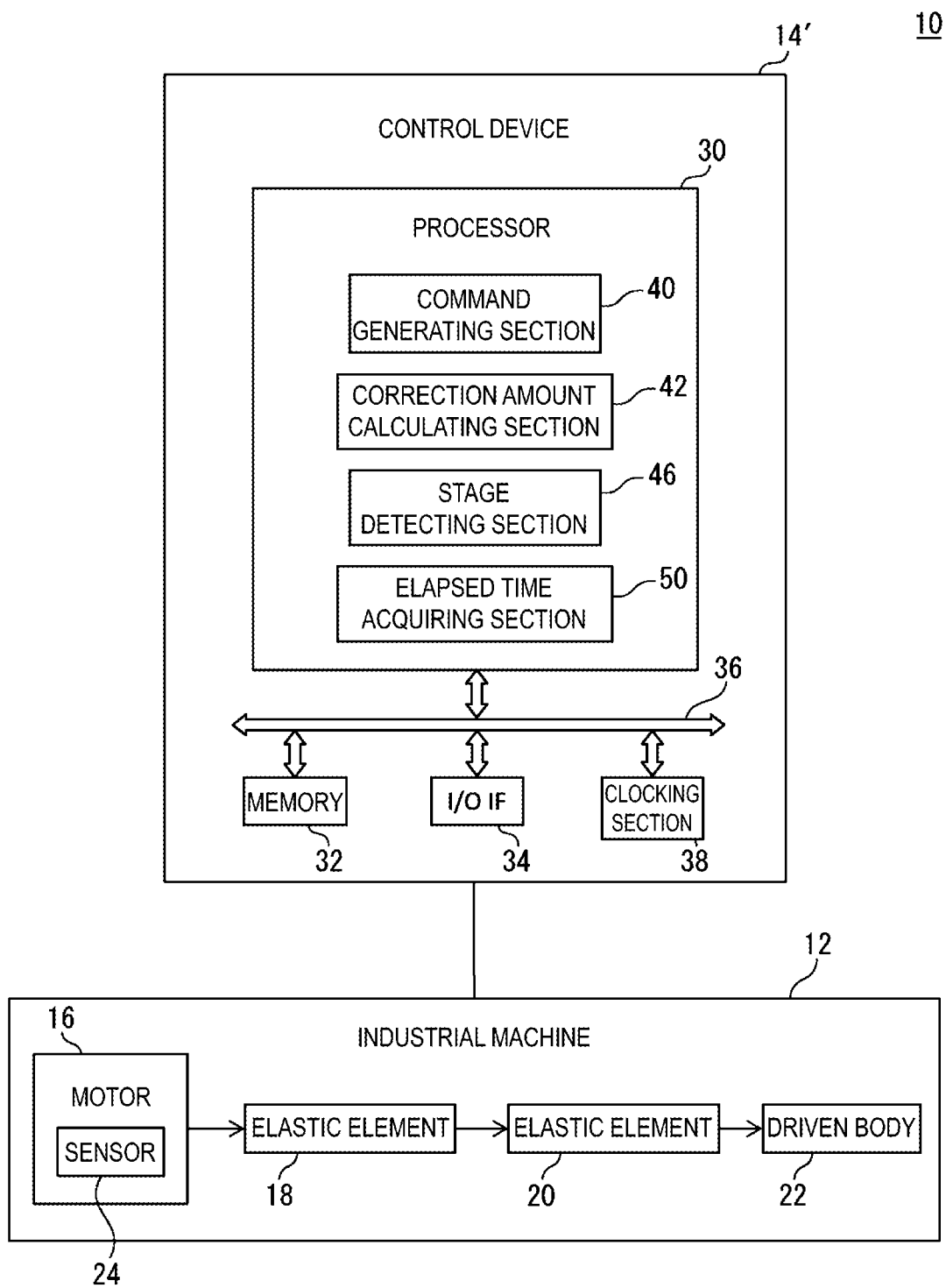
FIG. 10 is a block diagram of an industrial machine system including a control device according to another embodiment.

Subsequently, a control device 14' according to another embodiment will be described with reference to FIG. 10 and FIG. 11. The control device 14' is applicable to the industrial machine system 10 instead of the control device 14 described above, and controls the industrial machine 12. The control device 14' is different from the control device 14 described above in that a clocking section 38 is further included. The clocking section 38 is connected to the processor 30 via the bus 36, and clocks an elapsed time from an arbitrary time point in response to a command from the processor 30.

In the present embodiment, the processor 30 functions as an elapsed time acquiring section 50 instead of the above-described change acquiring section 44 or the movement amount acquiring section 48. Hereinafter, the function of the control device 14' according to the present embodiment will be described with reference to FIG. 11. Note that in the flow illustrated in FIG. 11, the same processing as in the flow of FIG. 7 is denoted by the same step numbers, and redundant descriptions are omitted.

Figure 11:
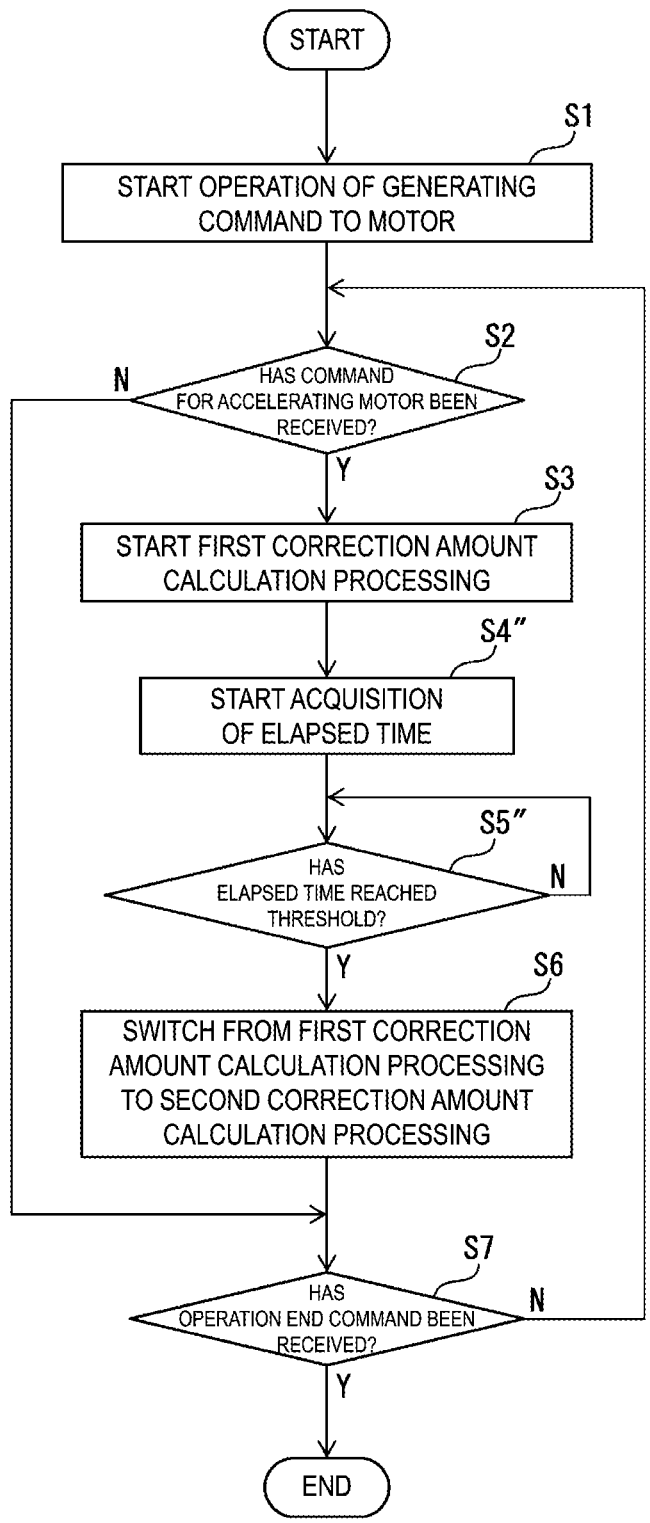
FIG. 11 is a flowchart illustrating an example of an operation flow of the control device illustrated in FIG. 10.

After starting the flow illustrated in FIG. 11, the processor 30 executes steps S1 to S3 described above. In step S4", the processor 30 starts clocking of elapsed time te from the time point (the time t0) at which YES is determined in step S2. Specifically, the processor 30 sends a command to the clocking section 38 at the time point t0 at which YES is determined in step S2, and the clocking section 38 starts clocking of the elapsed time te from the time point t0 in response to the command.

In step S5", the processor 30 determines whether or not the elapsed time te clocked by the clocking section 38 has reached a predetermined threshold $t_{th}$ ($te \geq t_{th}$). Here, the time $t_{th}$ from the time t0 to the time t1 of transition from the stage ST1 to the stage ST2 (i.e., the period of the stage ST1) changes in response to the command CM (the position command CMp, the velocity command CMv, the torque command CMτ, or the like) supplied to the motor 16 during the stage ST1. In other words, if the command CM is known, this time $t_{th}$ (the period of the stage ST1) can be acquired in advance by using an experimental method, for example.

As an example, the memory 32 stores in advance a data table TA in which the command CM and the time $t_{th}$ are stored in association with each other, and the processor 30 can acquire the time $t_{th}$ by acquiring the command CM supplied to the motor 16 during the stage ST1 from a statement defined in an operation program OP and searching the data table TA for the time $t_{th}$ corresponding to the command CM. By comparing the time $t_{th}$ acquired in this manner with the elapsed time te by using the time $t_{th}$ as the threshold $t_{th}$, it is possible to detect the timing (the time t1) of transition from the stage ST1 to the stage ST2.

The processor 30 functions as the stage detecting section 46, determines whether or not the elapsed time te has reached the threshold $t_{th}$ (te≥$t_{th}$), proceeds to step S6 when determining YES, and loops step S5" when determining NO. When it is determined to be YES in step S5", the state of the industrial machine 12 can be regarded as having transitioned from the stage ST1 to the stage ST2. After determining YES in step S5", the processor 30 executes above-described steps S6 and S7.

As described above, in the present embodiment, the stage detecting section 46 detects transition from the stage ST1 to the stage ST2 when the elapsed time te reaches the predetermined threshold $t_{th}$. According to this configuration, even when the velocity V (the velocity command CMv), the torque command CMτ, or the acceleration command CMα of the motor 16 in the stage ST1 is small, it is possible to reliably detect the transition from the stage ST1 to the stage ST2. Note that the processor 30 may execute step S3 after executing step S4".

Note that as described above, when the velocity V (the velocity command CMv), the torque command CMτ, or the acceleration command CMα is relatively large, the degree D of change becomes valid for detecting the transition from the stage ST1 to the stage ST2, and on the other hand, when the velocity V (the velocity command CMv), the torque command CMτ, or the acceleration command CMα is relatively small, the movement amount MA or the elapsed time te becomes valid for detecting the transition from the stage ST1 to the stage ST2.

The processor 30 may switch the parameter used for detecting the transition from the stage ST1 to the stage ST2 as the stage detecting section 46 between the degree D of change and the movement amount MA (or the elapsed time te) depending on whether or not the degree D of change is valid. Hereinafter, such a mode will be described with reference to FIG. 12 and FIG. 13.

Figure 12:
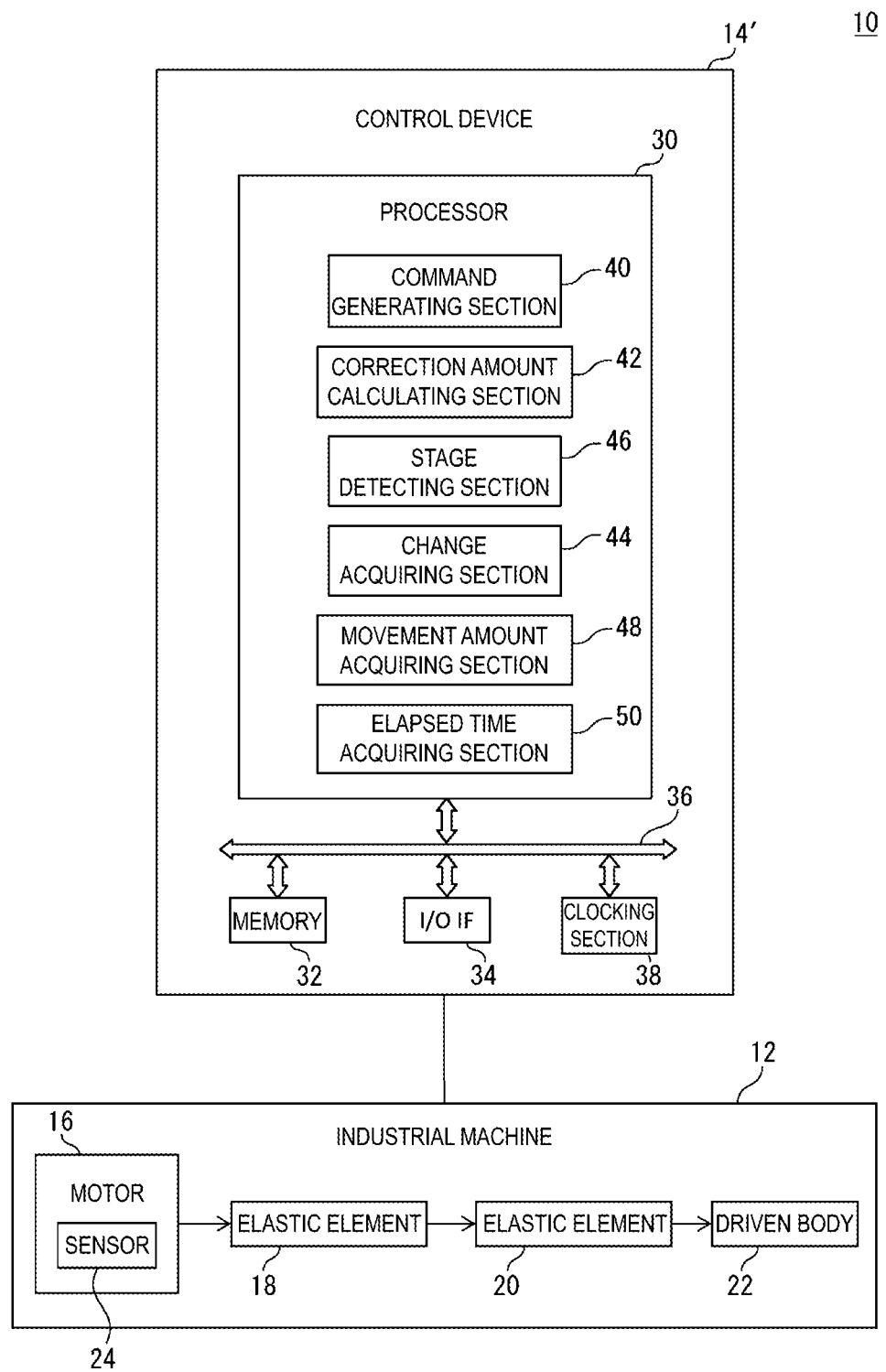
FIG. 12 is a block diagram illustrating another function of the control device illustrated in FIG. 10.
Figure 13:
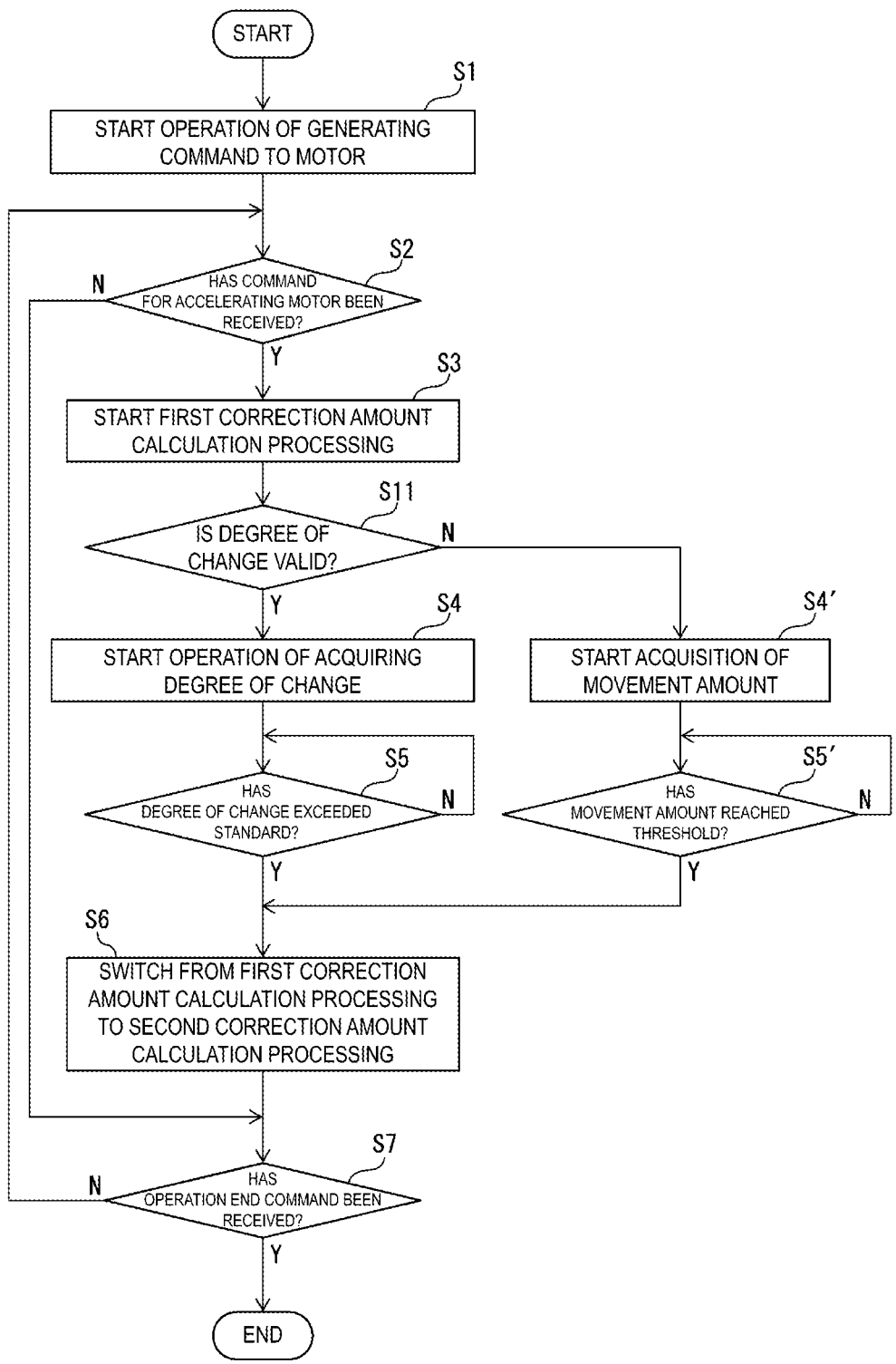
FIG. 13 is a flowchart illustrating another example of the operation flow of the control device illustrated in FIG. 10.

As illustrated in FIG. 12, in the present embodiment, the processor 30 of the control device 14' functions as the command generating section 40, the correction amount calculating section 42, the change acquiring section 44, the stage detecting section 46, the movement amount acquiring section 48, and the elapsed time acquiring section 50, and executes the flow illustrated in FIG. 13. Note that in the flow illustrated in FIG. 13, the same processing as in the flows of FIG. 7 and FIG. 9 are denoted by the same step numbers, and redundant descriptions are omitted.

After starting the flow illustrated in FIG. 13, the processor 30 executes above-described steps S1 to S3. In step S11, the processor 30 determines whether or not the degree D of change is valid as a parameter for detecting the transition from the stage ST1 to the stage ST2. As an example, the processor 30 determines whether or not the most recently acquired velocity feedback V, the velocity command CMv, the torque command CMt, or the acceleration command CMα is equal to or greater than a predetermined threshold y.

When the velocity feedback V, the velocity command CMv, the torque command CMτ, or the acceleration command CMα is equal to or greater than the threshold, the processor 30 determines that the degree D of change is valid (i.e., YES) and proceeds to step S4, and on the other hand, proceeds to step S4' when determining NO.

When determining YES in step S11, the processor 30 functions as the change acquiring section 44 and executes above-described steps S4 and S5, thereby detecting the transition from the stage ST1 to the stage ST2 based on the degree D of change. On the other hand, when determining NO in step S11, the processor 30 functions as the movement amount acquiring section 48 and executes above-described steps S4' and S5', thereby detecting the transition from the stage ST1 to the stage ST2 based on the movement amount MA.

As described above, in the present embodiment, the processor 30 determines whether or not the degree D of change is valid, and, in response to this determination result, switches the parameter used for detecting the transition from the stage ST1 to the stage ST2 between the degree D of change and the movement amount MA. According to this configuration, when the degree D of change is valid, the processor 30 can highly accurately detect the transition from the stage ST1 to the stage ST2 by monitoring the degree D of change, and when the degree D of change is not valid, the processor 30 can reliably detect the transition from the stage ST1 to the stage ST2 by monitoring the movement amount MA.

Note that in the flow illustrated in FIG. 12, when determining NO in step S11, the processor 30 may function as the elapsed time acquiring section 50, execute the above-described steps S4" and S5" instead of steps S4' and S5', and detect the transition from the stage ST1 to the stage ST2 based on the elapsed time te.

Note that before executing the flow illustrated in FIG. 7, FIG. 9, FIG. 11, or FIG. 12, the processor 30 may execute elastic parameter acquisition processing for acquiring the elastic parameter PR1 (e.g., the spring constant k1) of the elastic element 20 and the elastic parameter PR2 (e.g., the spring constant k2) of the elastic element 20.

For example, in the elastic parameter acquisition processing, the processor 30 operates the motor 16 in accordance with the command CM0 for accelerating the motor 16 after reversing the operation direction of the motor 16, thereby accelerating the driven body 22 after reversing the movement direction of the driven body 22. The spring constants k1 and k2 can be acquired based on the torque command CMτ or the force feedback F1 at this time and the position feedback P.

In step S2 described above, the processor 30 may determine whether or not the operation direction of the motor 16 has been reversed, based on, for example, the position feedback P, instead of determining whether or not there is the command CM for acceleration. The industrial machine 12 may further include a sensor 24' configured to acquire the position P of the driven body 22, and the processor 30 may acquire the position P of the driven body 22 from the sensor 24' as the position feedback P. The processor 30 may acquire load torque applied to the motor 16 instead of the current feedback I. This load torque also constitutes the force parameter FP described above.

In the above-described embodiments, the case has been described in which the processor 30 corrects the position command CMp with the correction amount β3. However, the present invention is not limited to this, and the processor 30 may correct the velocity command CMv with the obtained correction amount β. In this case, for example, the processor 30 may obtain a new correction amount β3' (=δβ3/δt) by first derivative, with respect to time, of the correction amount β3 obtained as described above, and apply (e.g., add) the new correction amount β3' to the velocity command CMv.

In the above-described embodiments, for easy understanding, the case has been described in which the industrial machine 12 includes the motor 16 that drives the driven body 22 in one axis (the axis A) direction and the elastic element 18 (ball screw). However, the present invention is not limited to this, and the industrial machine 12 may drive the driven body 22 in directions of two axes orthogonal to each other.

For example, the industrial machine 12 may include a motor 16A that drives the driven body 22 in the direction of a first axis (e.g., the axis A), an elastic element 18A, an elastic element 20A interposed between the driven body 22 and the elastic element 18A, a motor 16B that drives the driven body 22 in the direction of a second axis orthogonal to the first axis, an elastic element 18B, and an elastic element 20B interposed between the driven body 22 and the elastic element 18B. In this case, the processor 30 executes processing to detect the transition from the stage ST1 to the stage ST2 and processing to switch the correction amount calculation processing CP by the above-described method for each of the motors 16A and 16B.

In the above-described embodiments, for easy understanding, the case in which the two elastic elements 18 and 20 are interposed between the motor 16 and the driven body 22 has been described. However, the present invention is not limited to this, and three or more elastic elements may be interposed between the motor 16 and the driven body 22.

In this case, when the processor 30 operates the motor 16 in accordance with the command CM for operating the motor 16 so as to accelerate, the driving force F generated by the motor 16 acts on the first elastic element, the second elastic element, ... the n-th elastic element, the (n+1)-th elastic element, ... in stages in the order from the closest to the motor 16.

In response to this, the state of the industrial machine 12 sequentially transitions to the first stage ST1, the second stage ST2, ... the n-th stage STn, the (n+1)-th stage STn+1, . . . . The processor 30 functions as the stage detecting section 46, and, by the above-described method, detects the transition from the n-th stage STn in which the driving force F generated by the motor 16 in response to the command CM acts on the n-th elastic element (specifically, the first elastic element, the second elastic element, ..., and the n-th elastic element) to the (n+1)-th stage STn+1 in which the driving force F acts on the (n+1)-th elastic element through the n-th elastic element.

When detecting the transition from the n-th stage STn to the (n+1)-th stage STn+1, the processor 30 functions as the correction amount calculating section 42, and, by the above-described method, switches the correction amount calculation processing CP to execute from the n-th correction amount calculation processing CPn based on the elastic parameter PRn (specifically, the elastic parameters PR1, PR2, . . . , and PRn) of the n-th elastic element to the (n+1)-th correction amount calculation processing CPn+1 based on the elastic parameter PRn+1 of the (n+1)-th elastic element and the elastic parameter PRn (specifically, the elastic parameters PR1, PR2, . . . , PRn, and PRn+1).

As an example, in the n-th correction amount calculation processing CPn, the processor 30 acquires a combined spring constant Ks of the first elastic element, the second elastic element, . . . , the n-th−1 elastic element, and the n-th elastic element from the following Expression (6). Where, kn indicates the spring constant of the n-th elastic element.

$$1/KS = \sum (1/KN) = 1/K1 + 1/K2 \ldots + 1/KN \quad (6)$$

The processor 30 can obtain the correction amount β3 relating to the first elastic element, the second elastic element, . . . , the (n−1)-th elastic element, and the n-th elastic element by substituting the most recently acquired difference Δτ and the combined spring constant Ks acquired from the Expression (6) into the above-described Expression (5). It should be understood that the processor 30 can obtain the correction amount 3 by a similar method also in the (n+1)-th correction amount calculation processing CPn+1.

In the above-described embodiments, the motor 16 may be a linear motor. In this case, the elastic element 18 may be an armature propelled by a field element of the motor 16. Although the present disclosure has been described through the embodiments, the above-described embodiments do not limit the invention according to the claims.

REFERENCE SIGNS LIST

10 Industrial machine system
12 Industrial machine
14, 14' Control device
16 Motor
18, 20 Elastic element
22 Driven body
30 Processor
40 Command generating section
42 Correction amount calculating section
44 Change acquiring section
46 Stage detecting section
48 Movement amount acquiring section
50 Elapsed time acquiring section

The invention claimed is:

1. A control device connected to a driven body via a plurality of elastic elements and configured to control a motor that drives the driven body, the control device comprising:
a command generating section configured to generate a command for operating the motor so as to accelerate;
a correction amount calculating section configured to execute correction amount calculation processing to obtain a correction amount of the command, based on an elastic parameter representing elasticity of the elastic element; and
a stage detecting section configured to detect transition from a first stage in which a driving force generated by the motor in response to the command acts on a first elastic element to a second stage in which the driving force acts on a second elastic element through the first elastic element,
wherein, when the transition from the first stage to the second stage is detected, the correction amount calculating section is configured to switch the correction amount calculation processing to be executed, from first correction amount calculation processing executed based on a first elastic parameter of the first elastic element, to second correction amount calculation processing executed based on the first elastic parameter and a second elastic parameter of the second elastic element.

2. The control device of claim 1, further comprising a change acquiring section configured to acquire a degree of change in a force parameter representing the driving force with respect to time, wherein
the stage detecting section is configured to detect transition from the first stage to the second stage when the degree of change acquired by the change acquiring section exceeds a predetermined standard.

3. The control device of claim 2, wherein the force parameter includes the command or feedback supplied when the motor is operated in response to the command,
wherein the command includes a torque command that defines the driving force or an acceleration command that defines acceleration of the motor, and
wherein the feedback includes force feedback corresponding to the driving force, acceleration feedback corresponding to the acceleration, or current feedback indicating a current supplied to the motor.

4. The control device of claim 2, wherein the change acquiring section is configured to acquire a gradient of the force parameter as the degree of change.

5. The control device of claim 1, further comprising a movement amount acquiring section configured to acquire a movement amount of the motor from a time point at which the motor starts operation in accordance with the command,
wherein the stage detecting section is configured to detect transition from the first stage to the second stage when the movement amount reaches a predetermined threshold.

6. The control device of claim 1, further comprising an elapsed time acquiring section configured to acquire elapsed time from a time point at which the motor starts operation in accordance with the command,
wherein the stage detecting section is configured to detect transition from the first stage to the second stage when the elapsed time reaches a predetermined threshold.

7. The control device of claim 1, wherein the command generating section is configured to generate the command for accelerating the motor after reversing an operation direction of the motor.

8. The control device of claim 1, wherein the elastic parameter includes a spring constant of the elastic element, and
wherein, in the first correction amount calculation processing, the correction amount calculating section is configured to obtain a first correction amount relating to the first elastic element, using a first spring constant of the first elastic element and a force parameter representing the driving force.

9. The control device of claim 8, wherein, in the second correction amount calculation processing, the correction amount calculating section is configured to:
obtain a second correction amount relating to the second elastic element, using the force parameter and a second spring constant of the second elastic element, along with obtaining the first correction amount; and
obtain a sum of the first correction amount and the second correction amount as a third correction amount relating to the first elastic element and the second elastic element.

10. The control device of claim 8, wherein, in the second correction amount calculation processing, the correction amount calculating section is configured to obtain a second correction amount relating to the first elastic element and the second elastic element, using the force parameter and a combined spring constant of a first spring constant of the first elastic element and a second spring constant of the second elastic element.

11. The control device of claim 1, wherein the command includes a position command that defines a position of the driven body, and
wherein the correction amount calculating section is configured to obtain the correction amount for correcting the position command.

12. An industrial machine system, comprising:
a driven body;
a motor connected to the driven body via a plurality of elastic elements, and configured to drive the driven body; and
the control device of claim 1.

13. A method of controlling a motor connected to a driven body via a plurality of elastic elements and configured to drive the driven body, the method comprising:
generating, by a processor, a command for operating the motor so as to accelerate;
executing, by the processor, correction amount calculation processing to obtain a correction amount of the command, based on an elastic parameter representing elasticity of the elastic element;
detecting, by the processor, transition from a first stage in which a driving force generated by the motor in response to the command acts on a first elastic element to a second stage in which the driving force acts on a second elastic element through the first elastic element; and
when transition from the first stage to the second stage is detected, switching, by the processor, the correction amount calculation processing to be executed, from a first correction amount calculation processing executed based on a first elastic parameter of the first elastic element, to a second correction amount calculation processing executed based on the first elastic parameter and a second elastic parameter of the second elastic element.

* * * * *